(12) United States Patent
Matsuda

(10) Patent No.: US 9,132,878 B2
(45) Date of Patent: Sep. 15, 2015

(54) ELECTRIC MOTORCYCLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/884,898

(22) PCT Filed: Nov. 18, 2010

(86) PCT No.: PCT/JP2010/006762
§ 371 (c)(1),
(2), (4) Date: May 20, 2013

(87) PCT Pub. No.: WO2012/066598
PCT Pub. Date: May 24, 2012

(65) Prior Publication Data
US 2013/0233633 A1 Sep. 12, 2013

(51) Int. Cl.
B62M 7/00 (2010.01)
B62K 11/02 (2006.01)
B62K 19/30 (2006.01)
B62K 19/32 (2006.01)

(52) U.S. Cl.
CPC .............. *B62K 11/02* (2013.01); *B62K 19/30* (2013.01); *B62K 19/32* (2013.01); *B62K 2204/00* (2013.01); *B62K 2208/00* (2013.01)

(58) Field of Classification Search
CPC ............ B62M 7/06; B62M 7/12; B62M 6/45; B62M 6/60; B62K 2202/00; B62K 2204/00; B62K 5/025; B62K 5/06; B60K 1/00; B62D 61/08
See application file for complete search history.

(56) References Cited

U.S. PATENT DOCUMENTS

| 5,561,359 | A | * | 10/1996 | Matsuura et al. | 180/68.2 |
| 5,657,830 | A | * | 8/1997 | Kawashima et al. | 180/220 |
| 6,679,345 | B2 | * | 1/2004 | Hirayama et al. | 180/65.31 |
| 2002/0046891 | A1 | * | 4/2002 | Honda et al. | 180/220 |
| 2006/0000655 | A1 | * | 1/2006 | Schless | 180/220 |
| 2011/0036657 | A1 | * | 2/2011 | Bland et al. | 180/220 |
| 2012/0048635 | A1 | * | 3/2012 | Kuroki | 180/206.2 |
| 2013/0032424 | A1 | * | 2/2013 | Sand | 180/220 |
| 2013/0054067 | A1 | * | 2/2013 | Shoge et al. | 701/22 |

FOREIGN PATENT DOCUMENTS

| JP | 11255168 | A | | 9/1999 |
| JP | 2000238675 | A | | 9/2000 |
| JP | 2000309292 | A | | 11/2000 |
| JP | 2002068071 | A | | 3/2002 |
| JP | 2004080897 | A | | 3/2004 |
| JP | 2005239032 | A | | 9/2005 |
| JP | 2010083347 | A | | 4/2010 |
| JP | 2012101679 | A | * | 5/2012 |

OTHER PUBLICATIONS

ISA Japan, International Search Report of PCT/JP2010/006762, Feb. 4, 2011, WIPO, 4 pages.

* cited by examiner

*Primary Examiner* — Joseph Rocca
*Assistant Examiner* — Marlon Arce
(74) *Attorney, Agent, or Firm* — Alleman Hall McCoy Russell & Tuttle LLP

(57) ABSTRACT

An electric motorcycle according to the present invention includes a body frame having a head pipe supporting a steering shaft and a frame portion extending substantially rearward from the head pipe, an electric motor generating traveling power to be transmitted to a driving wheel, and an electric motor case housing the electric motor, wherein the electric motor case forms a part of the frame portion.

11 Claims, 7 Drawing Sheets

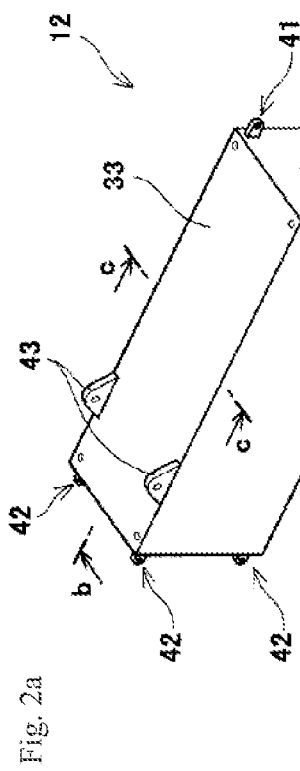
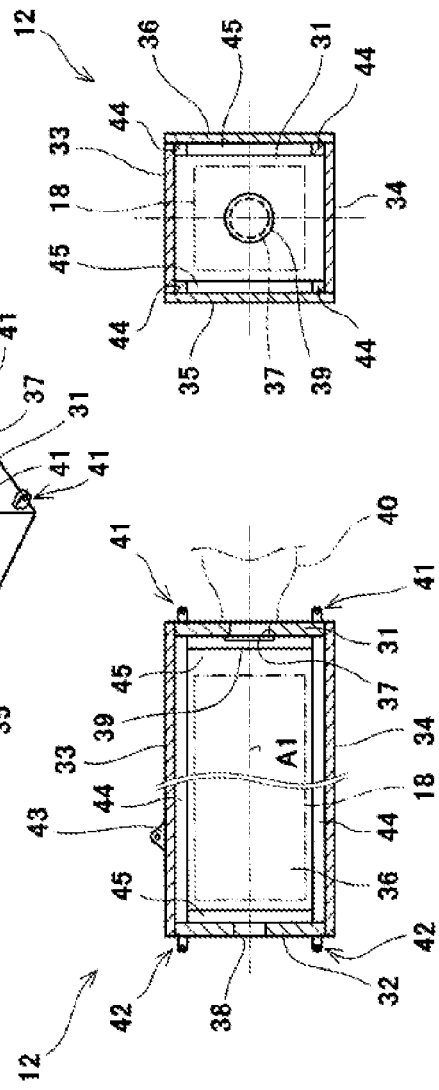

ELECTRIC MOTORCYCLE

TECHNICAL FIELD

The present invention relates to an electric motorcycle of which traveling power is generated by an electric motor.

BACKGROUND ART

In recent years, for a purpose of environmental protection and the like, an electric motorcycle in which an electric motor to be driven by electric energy stored in a battery is used as a traveling power source has been developed (for example, refer to Patent Document 1). The electric motor of Patent Document 1 is arranged on the same axis as that of a rear wheel adjacently to the left side of the rear wheel, so that rotation of an output shaft of the electric motor is directly transmitted to the rear wheel.

PRIOR ART DOCUMENTS

Patent Documents

Patent Document 1: Japanese Unexamined Patent Publication No. 2010-83347.

SUMMARY OF THE INVENTION

Problems to be Solved by the Invention

The electric motor mounted in the conventional electric motorcycle is relatively small. Thus, even when the electric motor is adjacent to the rear wheel, a weight balance is not affected and the size of a vehicle body is not increased. However, the electric motor generates only the same traveling power as that of a 50-cc engine.

In a case where an electric motorcycle corresponding to a sport-type bike and a cruiser is provided, there is a need for mounting a large and heavy electric motor so that larger traveling power can be generated. When a conventional electric motor attachment structure is adopted as it is, the large electric motor is provided so as to protrude on one side in the vehicle width direction from the rear wheel. Thus, the size of the vehicle body is increased in the vehicle width direction around the rear wheel. Further, a gravity center of the vehicle body is leaned from a center in the vehicle width direction to the side where the electric motor is arranged and also leaned on the rear side in the vehicle length direction. Thus, there is a fear that traveling stability is deteriorated.

An object of the present invention is to suppress a size increase of a vehicle body of an electric motorcycle and enhance traveling stability upon mounting a large and heavy electric motor.

Solutions to the Problems

The present invention is made in order to achieve the above object, and an electric motorcycle according to the present invention includes a body frame having a head pipe supporting a steering shaft and a frame portion extending substantially rearward from the head pipe, an electric motor generating traveling power to be transmitted to a driving wheel, and an electric motor case housing the electric motor, wherein the electric motor case forms a part of the frame portion.

With the above configuration, the electric motor forms the body frame itself. Therefore, even when the electric motor is large and heavy, in comparison to a case where the electric motor is supported on the existing body frame or directly connected to a rear wheel, a size increase of the entire vehicle body can be suppressed and traveling stability can also be enhanced.

The electric motor case may have a tubular accommodation portion, and a center axis of the accommodation portion may be directed in the vehicle width direction.

With the above configuration, even when a part away from the electric motor case in the radial direction is arranged at any position in the circumferential direction, the part can be easily attached on the outer surface side of the accommodation portion, so that the electric motor case can be favorably utilized as a part of the body frame.

The electric motor case may have an attachment protruding portion for attaching other parts on an outer surface of the accommodation portion, the accommodation portion may have an inner wall partitioning an inner space thereof in the axis direction, and a distance from the attachment protruding portion to the inner wall may be shorter than a distance from the attachment protruding portion to an end of the accommodation portion.

With the above configuration, the electric motor case can have particularly high rigidity around a part where the inner wall is provided in the axis direction. Since the attachment protruding portion for attaching other parts is provided as close as possible to such an inner wall, rigidity of the entire vehicle can be improved.

The frame portion may include a swing arm rotatably supporting a rear wheel in a rear end portion thereof, and the electric motor case may have an arm support portion pivotably supporting a front end portion of the swing arm in a rear portion thereof.

With the above configuration, the electric motor case can function as a frame member conventionally called as a pivot frame in a general body frame, so that the number of parts of the body frame can be reduced. The electric motor is arranged at a distance corresponding to length of the swing arm at most from the rear wheel. Therefore, a mechanism for transmitting the traveling power from the electric motor to the driving wheel can be formed to be compact.

The electric motor case may have a suspension support portion supporting a rear wheel suspension in a rear portion thereof, and the rear wheel suspension may be bridged over the suspension support portion and the swing arm.

With the above configuration, the electric motor case integrally forms a support structure of the swing arm and a support structure of the rear wheel suspension. Thus, the swing arm and the rear wheel suspension and the electric motor case can be unitized to be compact.

A battery supplying electric power to the electric motor, and a battery case accommodating the battery may be provided, the battery case may form a part of the frame portion and extend rearward and downward from the head pipe, and the electric motor case may have a connecting portion to be coupled to a rear end portion of the battery case in a front portion thereof.

With the above configuration, although in the electric motorcycle, a size increase and a weight increase of the battery are unavoidable in comparison to an automatic motorcycle having an internal combustion engine as a drive source, the battery case accommodating the battery forms the body frame itself. Therefore, in comparison to a case where the battery is supported on the existing body frame, the size increase of the entire vehicle body can be further suppressed.

An inverter converting a direct current stored in the battery into an alternating current, and an inverter case accommodating the inverter may be provided, and the inverter case may be arranged in the vicinity of the battery case and the electric motor case.

With the above configuration, the battery, the inverter, and the electric motor are arranged in the vicinity of each other. Therefore, the entire configuration for supplying the electric power from the battery to the electric motor via the inverter can be formed to be compact.

The electric motor case may have a main frame portion extending forward and upward from a front portion thereof, and a front end portion of the main frame portion may be coupled to the head pipe.

With the above configuration, the electric motor case can function as a frame member conventionally called as a main frame in a general body frame, so that the number of parts of the body frame can be reduced.

Effects of the Invention

In such a way, according to the present invention, the size increase of the vehicle body of the electric motorcycle can be suppressed.

BRIEF DESCRIPTION OF THE DRAWINGS

FIG. 2 (a) shows a perspective view of a battery case shown in FIG. 1; FIG. 2(b) shows a vertically sectional view of the battery case by line b-b of FIG. 2(a); and FIG. 2(c) shows a cross-sectional view of the battery case by line c-c of FIG. 2(a).

EMBODIMENTS OF THE INVENTION

Hereinafter, embodiments of the present invention will be described with reference to the drawings. It should be noted that the directions in the following description are based on the directions seen from a driver on an electric motorcycle.

First Embodiment

Figure 1:
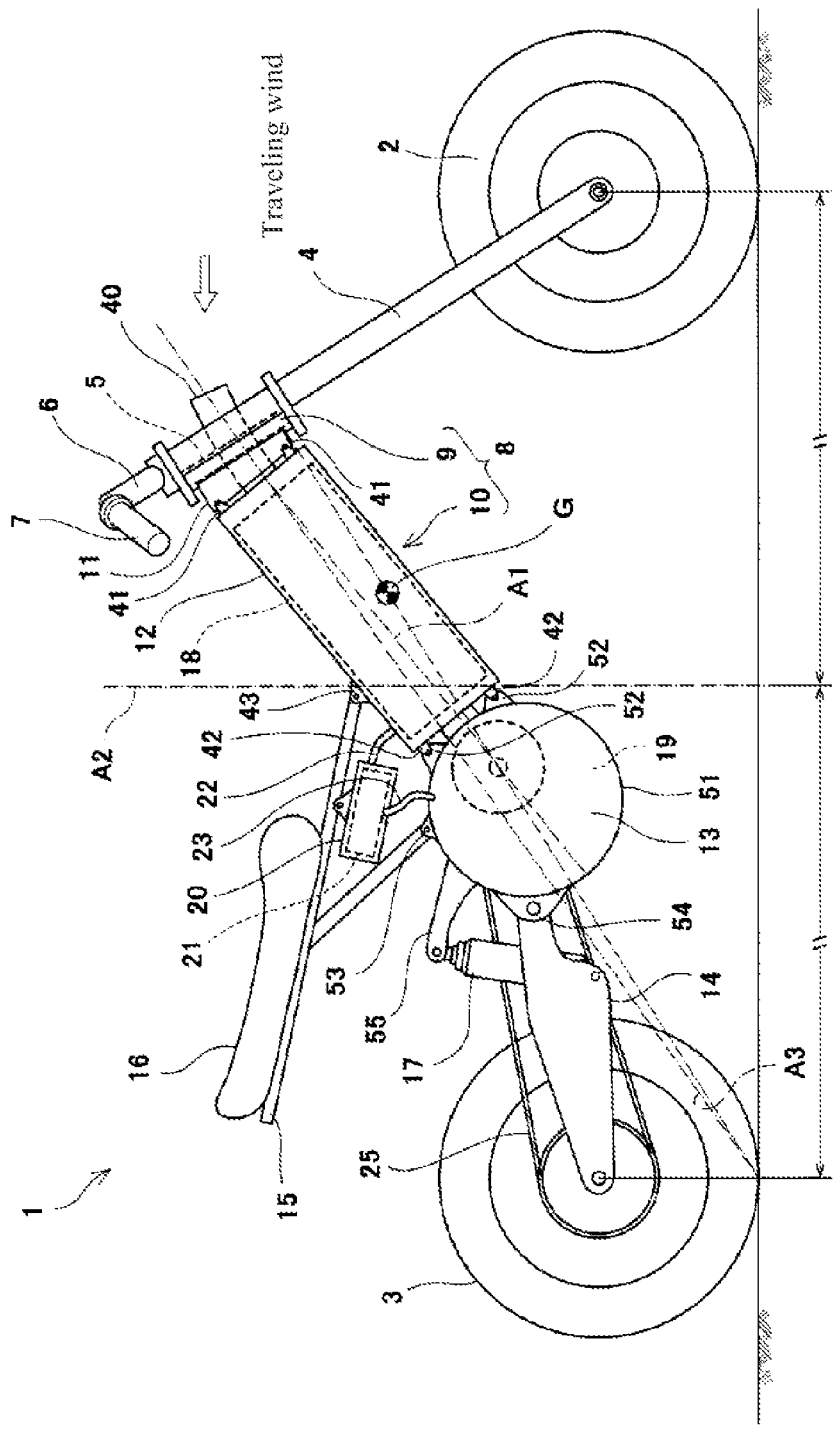
FIG. 1 shows a side view showing an electric motorcycle when seen from the right side according to a first embodiment of the present invention.

FIG. 1 is a side view showing an electric motorcycle 1 according to a first embodiment of the present invention when seen from the right side. The electric motorcycle 1 shown in FIG. 1 includes no internal combustion engine but travels by rotating a rear wheel 3 with power generated by an electric motor 19. The electric motorcycle 1 includes a front fork 4 provided in the substantially up and down direction at a predetermined caster angle, and a front wheel 2 serving as a driven wheel is rotatably supported on a lower portion of the front fork 4. A lower portion of a steering shaft 5 is connected to an upper portion of the front fork 4, and a bar-shaped handle 6 is attached to an upper portion of the steering shaft 5. An accelerator grip 7 is provided in a part of the handle 6 to be gripped by a right hand of a driver. The steering shaft 5 is turnably inserted into a head pipe 9 forming a body frame 8, and the front wheel 2 is steered by the driver turning the handle 6.

The head pipe 9 is coupled to a battery case 12 for accommodating a battery 18 via a connection frame 11. The battery case 12 is formed in a substantially cubic shape, and a center line A1 extending in the longitudinal direction of the battery case 12 extends rearward and downward along a center line in the vehicle width direction. A rear portion of the battery case 12 is coupled to a front portion of an electric motor case 13 for accommodating the electric motor 19. A front portion of a swing arm 14 extending in the substantially forward and rearward direction is pivoted on a rear portion of the electric motor case 13, and the rear wheel 3 is rotatably supported on a rear portion of the swing arm 14. A seat frame 15 for supporting a seat 16 on which the driver is seated is connected to an upper portion of the battery case 12 and an upper portion of the electric motor case 13. A rear wheel suspension 17 is bridged over the rear portion of the electric motor case 13 and the front portion of the swing arm 14.

In such a way, a frame portion 10 of the body frame 8 extending substantially rearward from the head pipe 9 to the rear wheel 3 is formed by the connection frame 11, the battery case 12, the electric motor case 13, the swing arm 14, and the seat frame 15. The battery case 12 and the electric motor case 13 also serve as a part of the body frame 8. The battery case 12 has not only a function of accommodating the battery 18 but also a function as a frame member which is conventionally called as a main frame in a general body frame, so that the electric motor case 13 and the head pipe 9 are coupled by one spine-shaped frame. The electric motor case 13 has not only a function of accommodating the electric motor 19 but also a function as a frame member which is conventionally called as a pivot frame in a general body frame. Thereby, in comparison to a case where the battery case 12 is supported on the existing body frame, a case where the electric motor case 13 is supported on the existing body frame, and a case where the electric motor case 13 is adjacently arranged on the left side or the right side of the rear wheel 3, the number of parts of the body frame can be reduced and a size increase of the entire vehicle can also be suppressed. Since the battery case 12 and the electric motor case 13 are arranged along the center line in the vehicle width direction, a weight balance of the vehicle can be favorably suppressed from being leaned on the left or right side.

Since the battery case 12 is connected to the head pipe 9 for supporting the steering shaft 4 for front wheel steering via the connection frame 11, the battery case 12 is arranged on the relatively front side. Referring to a straight line A2 indicating an intermediate position in the forward and rearward direction between a center of the front wheel 2 and a center of the rear wheel 3, a part of the battery case 12 on the front side of the straight line A2 is larger than a part on the rear side of the straight line A2. In such a way, since the battery case 12 which is a heavy object is placed on the front side for offset, a gravity center G of the entire vehicle can be positioned on the front side of the straight line A2. Thereby, a wheelie and a slippage of the front wheel 2 can be suppressed.

FIG. 1 shows a straight line A3 connecting a center of the head pipe 9 and a grounding point of the rear wheel 3, the straight line extending rearward and downward in a side view.

It should be noted that the straight line A3 is also called as a rolling center, and the center of the head pipe 9 is positioned on a center axis of the head pipe 9 and also positioned just in the middle in the axis direction. In the present embodiment, the battery case 12 extends rearward and downward from the head pipe 9. Thus, the battery case 12 can be arranged on the straight line A3 in a side view. The battery case 12 has high rigidity as described later. Since this highly-rigid part is arranged on the straight line A3, dynamic turning performance of the electric motorcycle 1 is improved. It should be noted that the steering shaft 5 extends in the direction vertical to a line connecting the grounding point of the rear wheel 3 and the gravity center G.

Further, in the present embodiment, the center line A1 of the battery case 12 is inclined downward more than the straight line A3. In other words, an angle made by the center line A1 and a horizontal line is larger than an angle made by the straight line A3 and the horizontal line. Therefore, referring to the straight line A3, a part of the battery case 12 on the upper side of the straight line A3 is smaller than a part on the lower side of the straight line A3. The electric motor case 13 is adjacent to the battery case 12 along the center line A1, and a relationship between the electric motor case 13 and the straight line A3 is the same as the battery case 12. In such a way, the battery case 12 and the electric motor case 13 which are heavy objects are placed on the lower side with respect to the straight line A3 for offset. Thus, the gravity center G of the entire vehicle can be positioned on the lower side of the straight line A3. Thereby, stability of straight traveling can be ensured.

The seat frame 15 supports an inverter case 20, and the inverter case 20 is arranged in the vicinity of the upper side of a rear end portion of the battery case 12 and in the vicinity of the upper side of a front end portion of the electric motor case 13. The inverter case 20 accommodates an inverter 21 for converting a direct current stored in the battery 18 into an alternating current to be supplied to the electric motor 19. The inverter 21 is connected to the battery 18 via a cable 22 and connected to the electric motor 19 via a cable 23. Since the inverter case 21 is in the vicinity of both the battery case 12 and the electric motor case 13, the entire configuration for supplying electric power from the battery 18 to the electric motor 19 via the inverter 21 can be formed to be compact.

FIG. 2(a) is a perspective view of the battery case 12 shown in FIG. 1, FIG. 2(b) is a vertically sectional view of the battery case 12 by line b-b of FIG. 2(a), and FIG. 2(c) is a cross-sectional view of the battery case 12 by line cc of FIG. 2(a). As shown in FIGS. 2(a) to 2(c), the battery case 12 has a front wall portion 31, a rear wall portion 32, an upper wall portion 33, a lower wall portion 34, a left side wall portion 35, and a right side wall portion 36, and is formed by combining these six wall portions 31 to 36 in a cubic shape. The front wall portion 31 and the rear wall portion 32 have an outer form of a substantially regular square, and are arranged in parallel to each other. The upper wall portion 33, the lower wall portion 34, the left side wall portion 35, and the right side wall portion 36 have an outer form of an oblong shape elongated in the forward and rearward direction, and connect the front wall portion 31 and the rear wall portion 32. Any of these wall portions is formed from highly-rigid metal such as aluminum, iron, magnesium, or titanium.

The battery 18 is accommodated in a space surrounded by inner surfaces of these six wall portions 31 to 36. A traveling wind inlet 37 for opening the space is formed to pass through a central part of the front wall portion 31, and a traveling wind outlet 38 for opening the space is formed to pass through a central part of the rear wall portion 32. An air filter 39 is provided on the inner surface of the front wall portion 31 so as to close the traveling wind inlet 37. A duct 40 is fixed to the front wall portion 31, and the duct 40 opens on the front side of the head pipe 9 (refer to FIG. 1). It should be noted that the duct 40 may be a single part independent from the parts forming the body frame 8, may include a part integrated with the head pipe 9, or may include a part integrated with the connection frame 11 (refer to FIG. 1). Traveling wind taken into the duct 40 is brought into the battery case 12 via the traveling wind inlet 37 and the air filter 39, passes through an interior of the battery case 12 in the longitudinal direction, and is brought out from the battery case 12 via the traveling wind outlet 38. Thereby, the battery 18 can be cooled down by the air, so that deterioration of the battery 18 can be favorably suppressed.

First connecting portions 41 for connecting the batter case 12 to the connection frame 11 (refer to FIG. 1) are provided on an outer surface of the front wall portion 31. The first connecting portions 41 are arranged at four corners of the outer surface. Each of the first connecting portions 41 includes two ribs protruding from the outer surface, and a through hole through which a bolt is inserted is formed in each of the ribs. Second connecting portions 42 for connecting the battery case 12 to the electric motor case 13 (refer to FIG. 1) are provided on an outer surface of the rear wall portion 32. The second connecting portions 42 are also arranged at four corners of the outer surface of the rear wall portion 32, and have the same structure as that of the first connecting portions 41. The first connecting portions 41 and the second connecting portions 42 are arranged so as to be overlapped with each other when seen in the longitudinal direction. In such a way, the cubic-shaped battery case 12 is supported on other frame members at four corners. Thus, rigidity against torsion about the center axis A1 is improved. It should be noted that connecting portions 43 for connecting the battery case 12 to the seat frame 15 (refer to FIG. 1) are provided on an outer surface of the upper wall portion 33.

Four wall portions of the upper wall portion 33, the lower wall portion 34, the left side wall portion 35, and the right side wall portion 36 cross adjacent two wall portions at right angle, and a cross section of the battery case 12 is a rectangular frame shape. Therefore, for example in comparison to a circular tube shape, the second moment of area about a neutral axis in the left and right direction and the second moment of area about a neutral axis in the up and down direction can be increased. Thereby, rigidity against up-down bending and left-right bending can be ensured. The cross section of the battery case 12 is a regular square frame shape in terms of an outer form and an inner form. Thus, the rigidity against the up-down bending and the left-right bending can be ensured in a well-balanced manner.

It should be noted that the shape of the cross section of the battery case 12 may be an oblong frame shape in which width of the upper wall portion 33 and the lower wall portion 34 is larger than height of the left side wall portion 35 and the right side wall portion 36. In this case, the rigidity against the left-right bending is preferentially improved, so that the dynamic turning performance of the electric motorcycle 1 is improved. In order to obtain the same effect, the sum of thickness of the left side wall portion 35 and the right side wall portion 36 may be larger than the sum of thickness of the upper wall portion 33 and the lower wall portion 34 while the outer form of the cross section is kept a regular square. The shape of the cross section may be changed so as to preferentially improve the rigidity against the up-down bending, and thereby, an effect of providing pliantness to the frame can be obtained.

Four wall portions of the upper wall portion 33, the lower wall portion 34, the left side wall portion 35, and the right side wall portion 36 cross adjacent two wall portions at right angle, so as to form four angular portions extending in the forward and rearward direction. Reinforcing beams 44 elongated in the forward and rearward direction are fixed on the inner surface side of each angular portion, and the reinforcing beams 44 connect the upper wall portion 33 and the lower wall portion 34. By providing such reinforcing beams 44, rigidity against compression and tension in the longitudinal direction is improved.

A pair of left and right reinforcing pillars 45 is fixed on the inner surface side of the front wall portion 31. Each of the reinforcing pillars 45 connects front end portions of two reinforcing beams 44 adjacent to each other in the up and down direction. A pair of left and right reinforcing pillars 45 is similarly fixed on the inner surface side of the rear wall portion 32. By providing such reinforcing pillars 45, the rigidity against the torsion about the center axis A1 is improved.

It should be noted that the connecting portions 41 to 43 are preferably formed on the reinforcing beams 44 and the reinforcing pillars 45. That is, the connecting portions 41, 42 may be arranged so as to be overlapped with the reinforcing pillars 45 when seen in the axis direction of the center axis A1 and in addition to this, to be overlapped with the reinforcing beams 44, and the connecting portions 43 may be arranged so as to be overlapped with the reinforcing beams 43 when seen in the surface normal direction of the upper wall portion 33 (direction orthogonal to the center axis A1). Thereby, attachment strength of these connecting portions 41 to 43 is enhanced.

Left side surfaces of the left reinforcing beams 44 are bonded to the inner surface of the left side wall 35, and right side surfaces of the right reinforcing beams 44 are bonded to the inner surface of the right side wall 36. By bonding the reinforcing beams 44 to the side walls 35, 36 in such a way, in comparison to a case where the reinforcing beams 44 are not bonded to the side walls 35, 36 but simply connect the front and rear walls 31, 32, torsion rigidity and vertical rigidity of a wall structure of the side walls 35, 36 can be enhanced. When the rigidity of the wall structure of the side walls 35, 36 is enhanced in such a way, the thickness of the upper wall portion 33 and the lower wall portion 34 can be smaller than that of the side walls 35, 36. At this time, the upper wall portion 33 and the lower wall portion 34 may be fixed to the side walls 35, 36 by screws. In such a way, the upper wall portion 33 and the lower wall portion 34 having relatively small thickness can provide a pliantness effect to the battery case 12.

Returning to FIG. 1, the electric motor case 13 is formed by casting a metal material such as aluminum, and has a substantially cylindrical accommodation portion 51 for accommodating the electric motor 19. An axis of the accommodation portion 51 and the electric motor 19 is directed in the left and right direction. The electric motor case 13 has four third connecting portions 52 provided so as to protrude from a front portion of an outer peripheral surface of the accommodation portion 51 and arranged away from each other in the up and down and left and right directions. These third connecting portions 52 are respectively fastened to the four second connecting portions 42 described above by bolts. The electric motor case 13 has a connecting portion 53 provided so as to protrude from an upper portion of the outer peripheral surface of the accommodation portion 51, and the seat frame 15 is coupled to the connecting portion 53. The electric motor case 13 has a pair of arm support portions 54 provided so as to protrude from a rear portion of the outer peripheral surface of the accommodation portion 51 and arranged away from each other in the left and right direction, and a front end portion of the swing arm 14 is supported by this pair of arm support portions 54 pivotably about an axis in the left and right direction. The electric motor case 13 has a suspension support portion 55 extending rearward from a rear upper portion of the outer peripheral surface of the accommodation portion 51. The suspension support portion 55 protrudes from a central part in the axis direction of the accommodation portion 51, that is, a part between the pair of arm support portions 54, and an upper end portion of the rear wheel suspension 17 is supported by a front end portion of the suspension support portion 55 pivotably about the axis in the left and right direction.

In such a way, the electric motor case 13 has the cylindrical accommodation portion 51 whose axis is directed in the left and right direction. Thus, the protruding portions 52 to 55 for attachment can be provided at arbitrary positions in the circumferential direction of the outer peripheral surface. Even when the parts away from the axis of the accommodation portion 51 in the radial direction are arranged at any positions in the circumferential direction, the parts can be readily coupled to the electric motor case 13 by utilizing the protruding portions for attachment, so that the electric motor case 13 can be favorably utilized as a part of the body frame 8. Particularly, the electric motor case can be also easily coupled to the rear end portion of the battery case 12 in which inclination of a horizontal line is adjusted in relation to the straight line A3. By providing the third connecting portions 52 protruding from the outer peripheral surface, the front portion of the electric motor case 13 forming a curved surface and the rear end portion of the battery case 12 forming a flat surface can be easily coupled. Furthermore, since the electric motor case 13 is formed by casting, the accommodation portion and the protruding portions for attachment can be easily integrated.

Traveling power generated by the electric motor 19 which is accommodated in the electric motor case 13 is transmitted to the rear wheel 3 via a power transmission mechanism including a chain 25 and the like. Since the electric motor case 13 is arranged to the rear wheel 3 at a distance corresponding to length in the forward and rearward direction of the swing arm 14 at most, such a power transmission mechanism can be formed to be compact. Since the electric motor case 13 has the arm support portions 54 and the suspension support portion 55, the electric motor case 13 is formed in such a manner that a support structure of the swing arm 14 and a support structure of the rear wheel suspension 17 are integrated. Therefore, the swing arm 14 and the rear wheel suspension 17 and the electric motor case 13 can be unitized to be compact.

Figure 3:
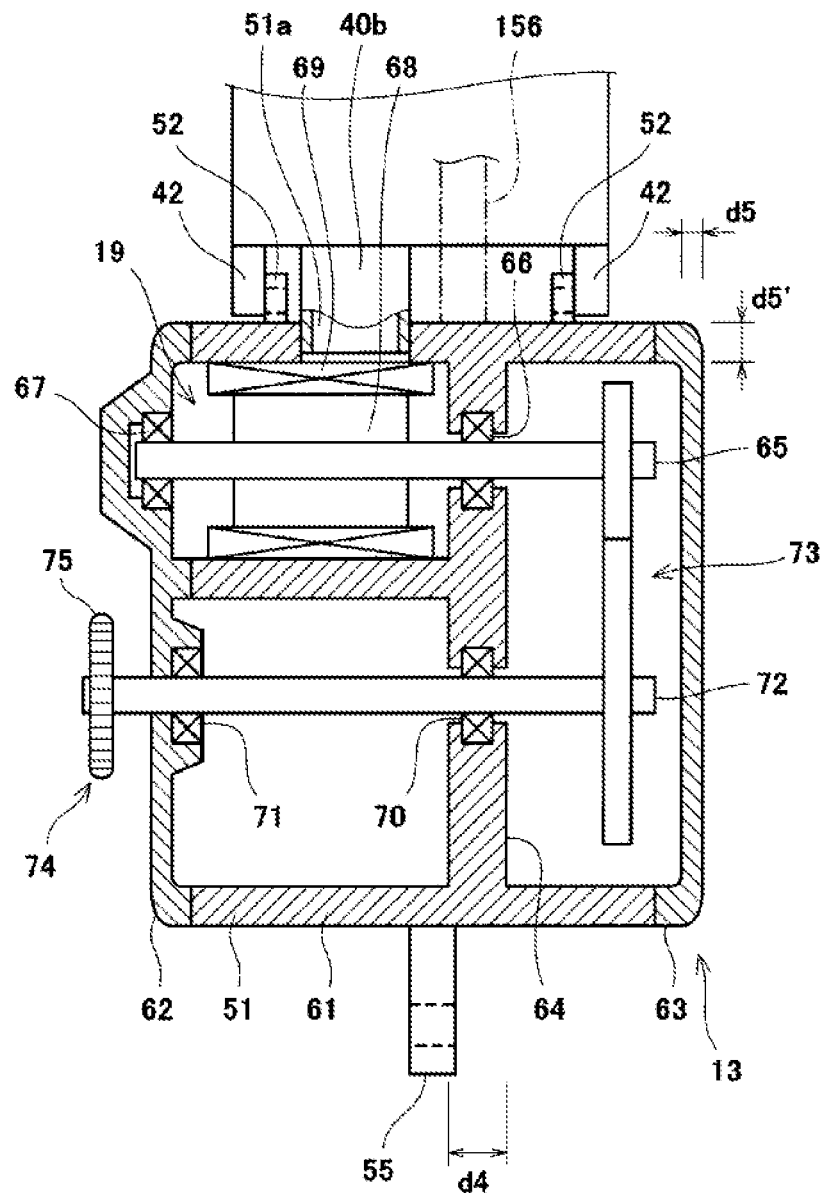
FIG. 3 shows a schematic sectional view of an electric motor case shown in FIG. 1.

FIG. 3 is a schematic sectional view of the electric motor case 13 shown in FIG. 1. As shown in FIG. 3, the electric motor case 13 has a cylindrical case body 61 having openings in both left and right ends, and a pair of covers 62, 63 provided so as to close the openings of the case body 61, and the accommodation portion 51 is formed by closing the case body 61 with the covers 62, 63. The case body 61 has an inner wall 64 provided in an intermediate part in the axis direction for partitioning an inner space into left and right parts. An output shaft 65 of the electric motor 19 is rotatably supported on a bearing 66 fitted into the inner wall 64 and a bearing 67 provided on an inner surface of the left cover 62. A rotor 68 and a stator coil 69 of the electric motor 19 are accommodated on the left side of the inner wall 64. A right end portion of the output shaft 65 protrudes on the right side of the inner wall 64. An intermediate shaft 72 rotatably supported on a bearing 70 which is fitted into the inner wall 64 and a bearing 71 which is provided on the inner surface of the left cover 62 is rotatably supported on the case body 61. The intermediate shaft 72 extends in parallel to the output shaft 65, and a right end portion thereof protrudes on the right side of the inner wall 64. A transmission mechanism 73 for transmitting rotation of the output shaft 65 to the intermediate shaft 72 is accommodated in a space on the right side of the inner wall 64. A left end portion of the intermediate shaft 72 protrudes on the left side from the left cover 62, and a driving sprocket 75 of a chain transmission mechanism 74 for transmitting rotation of the intermediate shaft 72 to the rear wheel 3 (refer to FIG. 1) is provided in an end portion thereof.

In such a way, the case body 61 of the electric motor case 13 has the inner wall 64. Thus, the electric motor case 13 has particularly high rigidity around a part where this inner wall 64 is provided. On the other hand, the protruding portions 52 to 55 for attachment described above are provided on an outer peripheral surface of the case body 61. A distance from the suspension support portion 55 among the protruding portions to the inner wall 64 is shorter than a distance to outer surfaces of the covers 62, 63 forming front ends in the axis direction of the accommodation portion 51, further, a distance to front ends of the case body 61 regulating mating surfaces to the covers 62, 63. In such a way, the protruding portions for attachment are provided at positions as close as possible to the inner wall 64. Thus, rigidity against a load of other parts attached to the electric motor case 13 is ensured by utilizing the protruding portions, so that rigidity of the entire vehicle can be improved. In order to make this effect remarkable, thickness d4 of the inner wall 64 may be larger than thickness d5 of a part forming an outer shell. Further, regarding this part forming the outer shell, thickness d5' around a part where the straight line A3 (refer to FIG. 1) connecting the center of the head pipe 9 (refer to FIG. 1) and the center of the rear wheel 3 (refer to FIG. 1) passes through may be larger than the thickness d5 of other parts. Thereby, the dynamic turning performance of the electric motorcycle 1 can be improved.

A traveling wind intake port 51a may be formed in the accommodation portion 51, and the traveling wind outlet 38 of the battery case 12 (refer to FIG. 2) and the traveling wind intake port 51a may be connected by a duct 40b. Thereby, the air can be sent inside the accommodation portion 51 in which the electric motor 19 is arranged via the battery case 12 and the duct 40b, so that the electric motor 19 can be favorably cooled down.

Second Embodiment

Figure 4A:
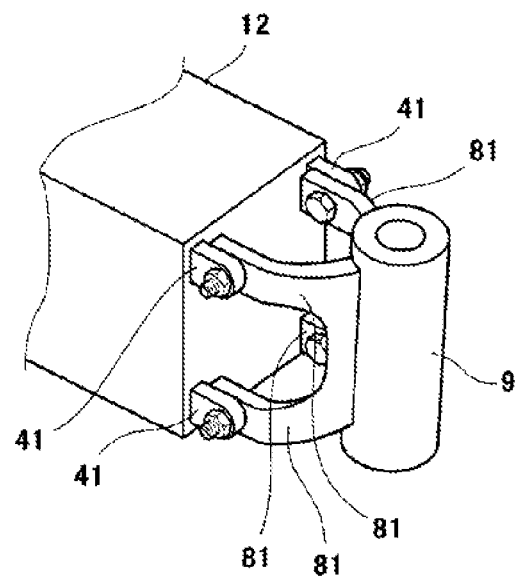
FIG. 4 (a) shows a perspective view showing connection members according to a second embodiment of the present invention.
FIG. 4(b) shows a perspective view showing connection members according to a modification of the second embodiment of the present invention.
Figure 4B:
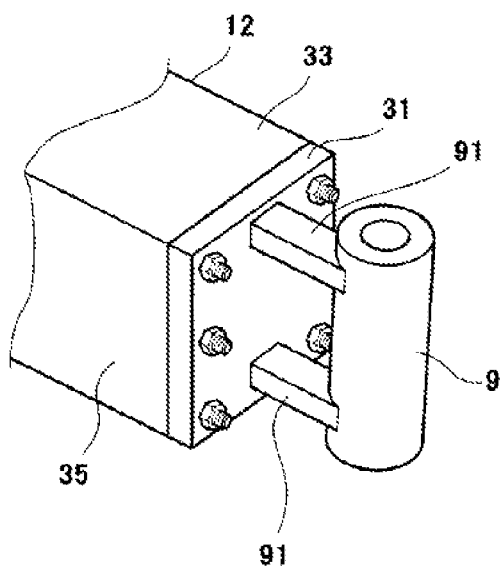

FIG. 4(a) is a perspective view showing connection members 81 according to a second embodiment of the present invention, and FIG. 4(b) a perspective view showing connection members 91 according to a modification of the second embodiment of the present invention. In the first embodiment, the flat plate-shaped connection member 11 (refer to FIG. 1) widened in the forward and rearward direction are branched into two from the head pipe 9. However, as shown in FIG. 4(a), the connection member may be branched into four from the head pipe 9 in accordance with the number and arrangement of the first connecting portions of the battery case. That is, a pair of upper and lower and a pair of left and right connection members 81 may be respectively connected to a total of four first connecting portions 41. As shown in FIG. 4(b), the front wall portion 31 of the battery case 12, the head pipe 9, and connection members 91 for connecting the front wall portion and the head pipe 9 may be integrated by casting or the like, and this integrated part may be combined to the upper wall portion 33 and the side wall portion 35 of the battery case 12 by bolts.

Third Embodiment

Figure 5:
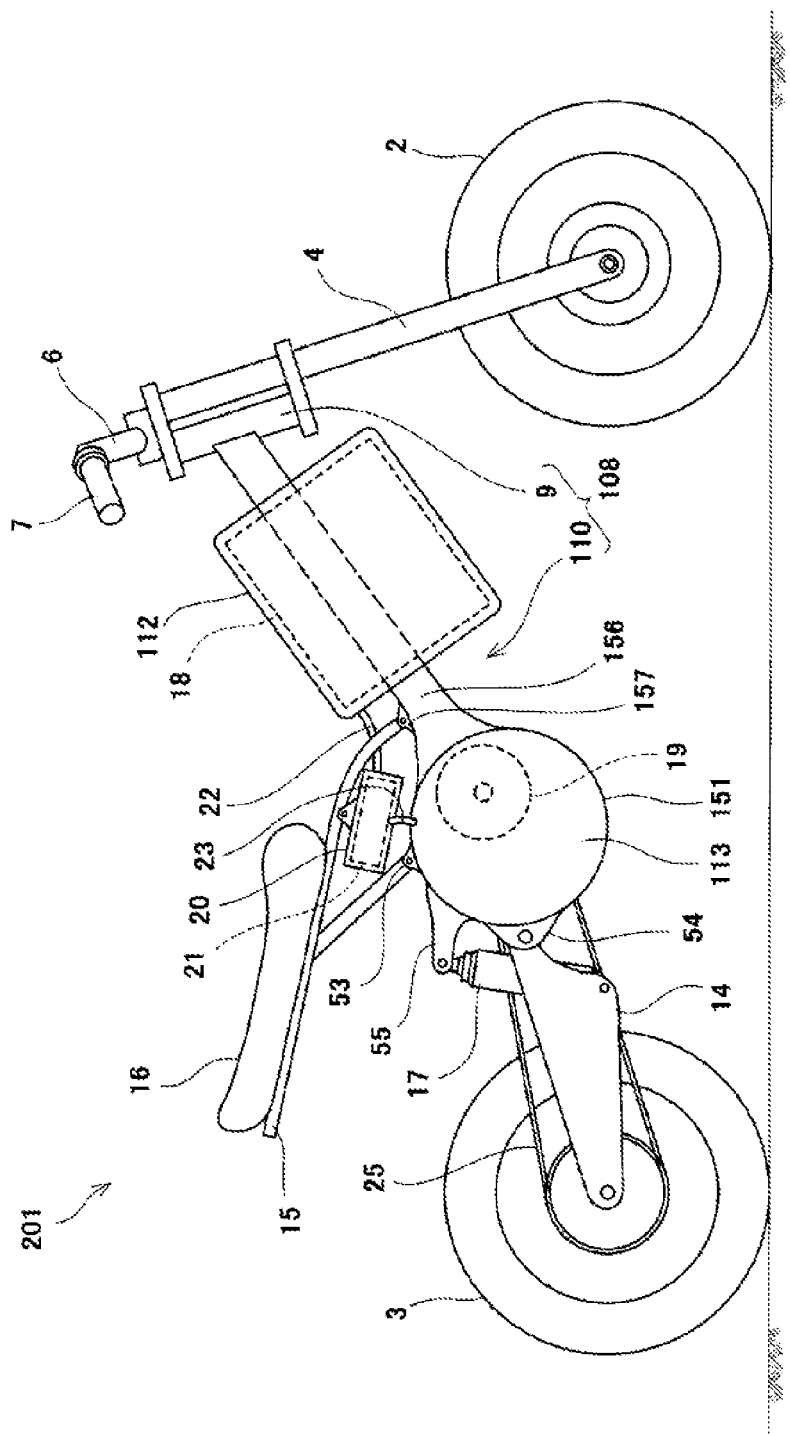
FIG. 5 shows a side view showing an electric motorcycle according to a third embodiment of the present invention when seen from the right side.

FIG. 5 is a side view showing an electric motorcycle 101 according to a third embodiment of the present invention when seen from the right side. The electric motorcycle 101 according to the present embodiment is different from the first embodiment in terms that a battery case 112 does not serve as a body frame 108. The same or corresponding elements as or to the first embodiment will be given the same reference signs, and overlapping detailed description will be omitted.

As shown in FIG. 5, the body frame 108 of the electric motorcycle 101 has the head pipe 9, and a frame portion 110 extending rearward from the head pipe 9, and the electric motor case 113 also serves as a part of the frame portion 110. The electric motor case 113 has a main frame portion 156 extending forward and upward from a front portion of an outer peripheral surface of the accommodation portion 151 in place of the third connecting portions according to the above embodiment. The main frame portion 156 extends from a central part in the axis direction of the accommodation portion 151, and a front end portion thereof is coupled to the head pipe 9. In such a way, in the present embodiment, the electric motor case 113 has a function as a frame part which is conventionally called as a pivot frame in a general body frame and also a function as a frame part which is called as a main frame. Thereby, even without the configuration that the battery case 112 serves as a part of the body frame 108, an increase of the number of parts of the body frame 108 can be suppressed.

The main frame portion 156 is provided on a center line in the vehicle width direction of the vehicle or in the vicinity of the center line, so that the head pipe 9 and the accommodation portion 151 of the electric motor case 113 are coupled by one backbone frame. It should be noted that a connecting portion 157 for coupling the seat frame is provided in a rear upper portion of the main frame portion 156. When the main frame portion 156 is arranged on the center line in the vehicle width direction or in the vicinity of the center line, a distance between the inner wall 64 (refer to FIG. 3) according to the above embodiments and the main frame portion 156 (refer to FIG. 3) can be as short as possible. Thus, rigidity of the entire body frame can be favorably increased. Particularly, as shown in FIG. 3, when the inner wall 64 and the main frame portion 156 are arranged so as to be overlapped with each other in the axis direction, the rigidity can be favorably improved. It should be noted that the main frame portion 156 may be solid or hollow. When the main frame portion is hollow, a sectional shape of the main frame portion 156 may be formed in a rectangular frame shape and further, reinforcing beams and reinforcing pillars which are the same as the above embodiments may be provided on the inner surface side.

A pair of battery cases 112 accommodating the batteries 18 is suspended on a left side surface and a right side surface of the main frame portion 156. Since the battery cases 112 are arranged on the left and right sides in a well-balanced manner, the gravity center of the vehicle is prevented from being leaned in the vehicle width direction.

Fourth Embodiment

Figure 6:
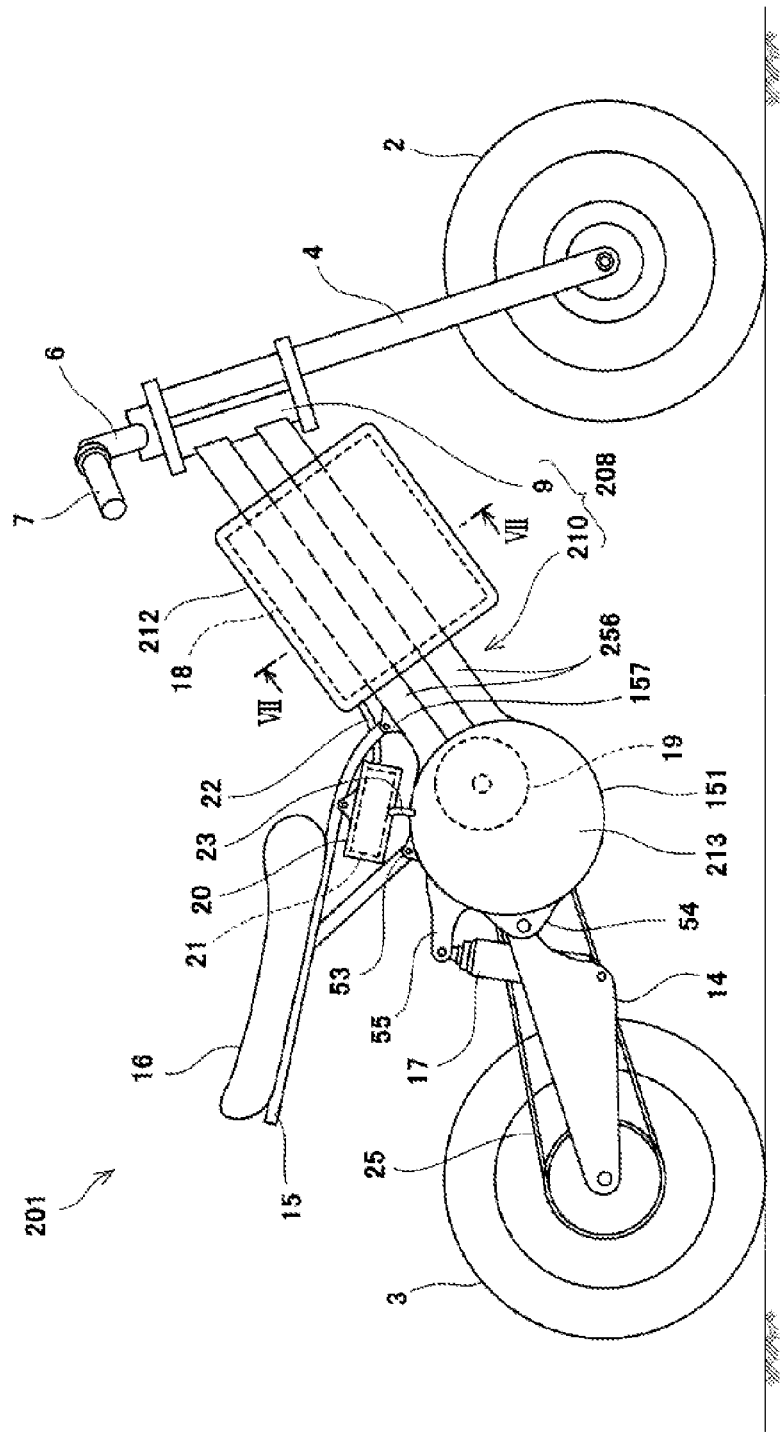
FIG. 6 shows a side view showing an electric motorcycle according to a fourth embodiment of the present invention when seen from the right side.

FIG. 6 is a side view showing an electric motorcycle 201 according to a fourth embodiment of the present invention when seen from the right side. The electric motorcycle 201 according to the present embodiment matches with the third embodiment in terms that a battery case 212 does not serve as a body frame 208. The same or corresponding elements as or to the first embodiment will be given the same reference signs, and overlapping detailed description will be omitted.

As shown in FIG. 6, the body frame 208 of the electric motorcycle 201 has the head pipe 9, and a frame portion 210 extending rearward from the head pipe 9, and an electric motor case 213 also serves as a part of the frame portion 210. The electric motor case 213 has a pair of upper and lower main frame portions 256 extending forward and upward from a front portion of an outer peripheral surface of an accommodation portion 251. The main frame portions 256 extend from a central part in the axis direction of the accommodation portion 251, and front end portions thereof are coupled to the head pipe 9. This configuration is the same as that of the third embodiment. Thus, as well as the third embodiment, even without the configuration that the battery case 212 serves as a part of the body flume 208, an increase of the number of parts of the body frame 208 can be suppressed.

Figure 7:
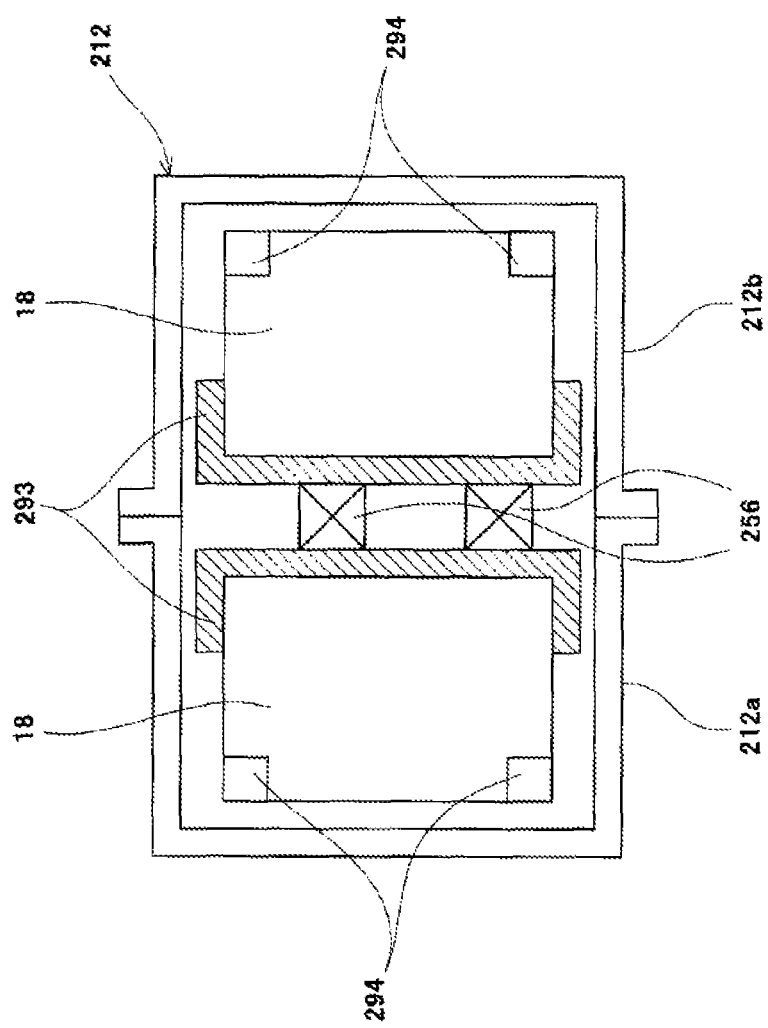
FIG. 7 shows a sectional view of main frames and a battery case by line VII-VII of FIG. 6.

FIG. 7 is a sectional view of the main frame portions 256 and the battery case 212 by line VII-VII of FIG. 6. As shown in FIG. 7, brackets 293 for connecting the pair of upper and lower main frame portions 256 are fixed to left and right side surfaces of the main frame portions 256. A pair of upper and lower flanges protrudes outward in the vehicle width direction from an upper end portion and a lower end portion of each of the brackets 293, and the bracket 293 is formed so as to have a U-shaped section as a whole. The battery 18 is attached so as to be fitted into a recessed part of this bracket 293 having the U-shaped section from the outer side in the vehicle width direction. It should be noted that after the battery 18 is fitted, a rubber band (not shown) can be looped over the upper end portion and the lower end portion of the bracket 293. When such a rubber hand is provided, the battery 18 can be favorably prevented from dropping off from the bracket 293. Since the heavy batteries 18 can be arranged symmetrically with respect to the main frame portions 256, the gravity center of the motorcycle can be positioned on the center side in the vehicle width direction where the main frame portions 256 are arranged, thereby turning performance is improved.

The battery case 212 is formed by assembling left and right dividable case half bodies 212a, 212b with bolts. By assembling the left and right case half bodies 212a, 212b, a part of the upper and lower main frame portions 256, the brackets 293, and the batteries 18 are accommodated inside the battery case 212. Front end portions and rear end portions of the upper and lower main frame portions 256 are respectively exposed on the front side and the rear side from the battery case 212 (refer to FIG. 6).

Terminals 294 are provided inside the battery case 212, and the batteries 18 are electrically connected to other electric parts such as the inverter 21 (refer to FIG. 6) via the terminals 294. The pair of upper and lower terminals 294 is provided on the outer side in the vehicle width direction of the battery 18, and the terminal 294 on one side serves as for example a positive electrode and the other terminal serves as a negative electrode. In such a way, since both the pair of terminals 294 is arranged outward in the vehicle width direction, a cable structure of connecting to the battery 18 can he simplified. If the terminals 294 are provided on the inner side, there is a need for preliminarily connecting cables to the terminals 294 before attaching the battery 18 to the bracket 293. Thus, length of the cables has to he extended, so that looseness of the cables is generated when the battery 18 is fitted into the bracket 293. By arranging the terminals 294 on the outer side, such a situation can he favorably avoided.

It should be noted that the present invention is not limited to the embodiments described above but change, addition, or deletion can be made to the configuration thereof within a range not departing from the gist of the present invention. The above embodiments may he arbitrarily combined with each other. For example, a portion of configuration or method in one embodiment may be applied to other embodiments.

INDUSTRIAL APPLICABILITY

As described above, the electric motorcycle according to the present invention has an effect of suppressing the size increase of the vehicle body and ensuring traveling stability even when the electric motor becomes large and heavy. It is beneficial to apply the present invention to an electric motorcycle corresponding to a sports utility vehicle and a cruise in which a high-output electric motor is mounted,

DESCRIPTION OF REFERENCE SIGNS

1: Electric motorcycle
2: Front wheel
3: Rear wheel
5: Steering shaft
8: Body frame
9: Head pipe
10: Frame portion
11: Connection frame
12: Battery case
13: Electric motor case
14: Swing arm
15: Seat frame
17: Rear wheel suspension
18: Battery
19: Electric motor
20: Inverter case
21: Inverter
22, 23: Cable
51: Accommodation portion
52: Third connecting portion
53: Connecting portion
54: Arm support portion
55: Suspension support portion
64: Inner wall

The invention claimed is:

1. An electric motorcycle comprising:
a body frame having a head pipe supporting a steering shaft and a frame portion extending substantially rearward from the head pipe;
an electric motor generating traveling power to be transmitted to a driving wheel; and
an electric motor case housing the electric motor, wherein
the electric motor case forms a part of the frame portion, wherein
the frame portion has a swing arm rotatably supporting a rear wheel in a rear end portion thereof,
the electric motor case has an arm support portion pivotably supporting a front end portion of the swing arm in a rear portion thereof, and a suspension support portion supporting a rear wheel suspension in the rear portion thereof, and
the rear wheel suspension is bridged over the suspension support portion and the swing arm.

2. The electric motorcycle according to claim 1, wherein the electric motor case has a tubular accommodation portion and a center axis of the accommodation portion is directed in a vehicle width direction.

3. The electric motorcycle according to claim 2, wherein the electric motor case has an attachment protruding portion for attaching other parts on an outer surface of the accommodation portion,
   the accommodation portion has an inner wall partitioning an inner space thereof in an axis direction, and
   a distance from the attachment protruding portion to the inner wall is shorter than a distance from the attachment protruding portion to an end of the accommodation portion.

4. The electric motorcycle according to claim 1, further comprising:
   a battery supplying electric power to the electric motor; and
   a battery case accommodating the battery, wherein
   the battery case forms a part of the frame portion and extends rearward and downward from the head pipe, and
   the electric motor case has a connecting portion to be coupled to a rear end portion of the battery case in a front portion thereof.

5. The electric motorcycle according to claim 4, further comprising:
   an inverter converting a direct current stored in the battery into an alternating current; and
   an inverter case accommodating the inverter, wherein
   the inverter case is arranged in the vicinity of the battery case and the electric motor case.

6. The electric motorcycle according to claim 1, wherein the electric motor case has a main frame portion extending forward and upward from a front portion thereof, and
   a front end portion of the main frame portion is coupled to the head pipe.

7. An electric motorcycle comprising:
   a body frame having a head pipe supporting a steering shaft and a frame portion extending substantially rearward from the head pipe;
   an electric motor generating traveling power to be transmitted to a driving wheel; and
   an electric motor case housing the electric motor, wherein
   the electric motor case forms a part of the frame portion,
   the frame portion has a swing arm rotatably supporting a rear wheel in a rear end portion thereof,
   the electric motor case has an arm support portion pivotably supporting a front end portion of the swing arm in a rear portion thereof and a suspension support portion supporting a rear wheel suspension in the rear portion thereof,
   the rear wheel suspension is bridged over the suspension support portion and the swing arm,
   the electric motor case has an accommodation portion, and the suspension support portion is provided on an outer peripheral surface of the accommodation portion;
   the accommodation portion has an inner wall partitioning an inner space thereof in an axis direction; and
   the suspension support is provided in the vicinity of the inner wall.

8. An electric motorcycle comprising:
   a body frame having a head pipe supporting a steering shaft and a frame portion extending substantially rearward from the head pipe;
   an electric motor generating traveling power to be transmitted to a driving wheel; and
   an electric motor case housing the electric motor, wherein
   the electric motor case forms a part of the frame portion,
   the frame portion has a swing arm rotatably supporting a rear wheel in a rear end portion thereof,
   the electric motor case has an arm support portion pivotably supporting a front end portion of the swing arm in a rear portion thereof and a suspension support portion supporting a rear wheel suspension in the rear portion thereof,
   the rear wheel suspension is bridged over the suspension support portion and the swing arm,
   the electric motor has an accommodation portion which has an inner wall partitioning an inner space thereof in an axis direction,
   the accommodation portion has a structure in which a thickness of the inner wall is larger than a thickness of a part forming an outer shell, and
   the suspension support portion is provided on an outer surface of the accommodation portion in the vicinity of the inner wall.

9. An electric motorcycle comprising:
   a body frame having a head pipe supporting a steering shaft and a frame portion extending substantially rearward from the head pipe;
   an electric motor generating traveling power to be transmitted to a driving wheel; and
   an electric motor case housing the electric motor, wherein
   the electric motor case forms a part of the frame portion,
   the frame portion has a swing arm rotatably supporting a rear wheel in a rear end portion thereof,
   the electric motor case has an arm support portion pivotably supporting a front end portion of the swing arm in a rear portion thereof and a suspension support portion supporting a rear wheel suspension in the rear portion thereof,
   the rear wheel suspension is bridged over the suspension support portion and the swing arm,
   the electric motor case has an accommodation portion which has an inner wall partitioning an inner space thereof in an axis direction,
   the suspension support portion is provided on an outer surface of the accommodation portion in the vicinity of the inner wall, and the suspension support portion extends rearward from the outer peripheral surface of the accommodation portion.

10. An electric motorcycle comprising:
    a body frame having a head pipe supporting a steering shaft and a frame portion extending substantially rearward from the head pipe;
    an electric motor generating traveling power to be transmitted to a driving wheel; and
    an electric motor case housing the electric motor, wherein
    the electric motor case forms a part of the frame portion,
    the frame portion has a swing arm rotatably supporting a rear wheel in a rear end portion thereof,
    the electric motor case has an arm support portion pivotably supporting a front end portion of the swing arm in a rear portion thereof and a suspension support portion supporting a rear wheel suspension in the rear portion thereof,
    the rear wheel suspension is bridged over the suspension support portion and the swing arm,
    a lower end portion of the rear wheel suspension is supported on a lower portion of the swing arm; and
    the rear wheel suspension extends in an up and down direction in a position behind the electric motor case.

11. An electric motorcycle comprising:
    a body frame having a head pipe supporting a steering shaft and a frame portion extending substantially rearward from the head pipe and including a main frame;
    an electric motor generating traveling power to be transmitted to a driving wheel; and an electric motor case housing the electric motor, wherein the electric motor case has a suspension support portion supporting a rear wheel suspension, a front end portion of the electric motor case is connected to a rear end portion of the main frame such that the electric motor case forms a part of the frame portion, and the electric motor is placed at a front side inside of the electric motor case.

* * * * *